(12) United States Patent
Guimarães et al.

(10) Patent No.: US 9,553,949 B2
(45) Date of Patent: Jan. 24, 2017

(54) METHOD AND SYSTEM IMPLEMENTED BY A COLLABORATIVE DISTRIBUTED COMPUTATIONAL NETWORK, AND RELATED DEVICES

(71) Applicant: SABIA EXPERIENCE TECNOLOGIA S.A., Florianópolis (BR)

(72) Inventors: Marcelo Ferreira Guimarães, Florianópolis (BR); Renato Parenti Turcato, Florianópolis (BR); Demetrius Ribeiro Lima, Florianópolis (BR); Alexandre Moura Paes De Barros, Florianópolis (BR); Caio Vinicius Maia Villela, Florianópolis (BR); Adir Pedro Filho, Florianópolis (BR); Emanuel Mota Cordioli, Florianópolis (FR); George Tavares, Florianópolis (BR); Richard Faust, Florianópolis (BR); Diego Fernando Dotta Couto, Florianópolis (BR)

(73) Assignee: SABIA EXPERIENCE TECNOLOGIA S.A., Florianopolis (BR)

( * ) Notice: Subject to any disclaimer, the term of this patent is extended or adjusted under 35 U.S.C. 154(b) by 201 days.

(21) Appl. No.: 14/420,219

(22) PCT Filed: Aug. 8, 2013

(86) PCT No.: PCT/BR2013/000295
§ 371 (c)(1),
(2) Date: Feb. 6, 2015

(87) PCT Pub. No.: WO2014/022901
PCT Pub. Date: Feb. 13, 2014

(65) Prior Publication Data
US 2015/0201038 A1    Jul. 16, 2015

(30) Foreign Application Priority Data

Aug. 10, 2012    (BR) .......................... 1020120200317

(51) Int. Cl.
*G06F 15/16* (2006.01)
*H04L 29/08* (2006.01)
(Continued)

(52) U.S. Cl.
CPC ........... *H04L 67/306* (2013.01); *G06F 3/0412* (2013.01); *G06F 3/0488* (2013.01); *G06Q 10/10* (2013.01); *H04L 67/42* (2013.01)

(58) Field of Classification Search
USPC ................ 709/204; 345/175; 706/59, 46, 45
See application file for complete search history.

(56) References Cited

U.S. PATENT DOCUMENTS

| | | | | |
|---|---|---|---|---|
| 756,237 | A * | 4/1904 | Canon ...................... | A41F 3/00 2/310 |
| 2002/0049692 | A1 * | 4/2002 | Venkatram .......... | G06F 17/3089 706/59 |

(Continued)

FOREIGN PATENT DOCUMENTS

EP    0756237    1/1997

OTHER PUBLICATIONS

Wenger, Etienne, "Digital Habitats: Stewarding Technology for Communities", Chapter 1, First Edition, Aug. 2009, Portland, United States of America.

(Continued)

*Primary Examiner* — Tammy Nguyen
(74) *Attorney, Agent, or Firm* — Foley & Lardner LLP; James De Vellis

(57) ABSTRACT

Method and system implemented by a collaborative distributed computational network, and related devices, compris- (Continued)

ing a plurality of client devices supported by a computational network to cooperatively perform interactive operations in at least one community of practice organized in a hierarchical structure at strategic levels, wherein said method comprises the steps of registering at least one community of practice on the computational network, creating a network of practice; assigning a unique identification code for a device on the network of practice computational network, identifying a user through an unique identification user code; connecting the user to at least one community of network of practice; defining a practice; unfolding the practice in strategic levels of this community of practice; registering the practice on the computational network; locating the practice in organizational or geographical coordinates; registering the localization of practice on the computational network; selecting a template guide containing sequential instructions content (as a script) and components; configuring the guide that implements the practice at the strategic level of the community of practice; publishing the guide in a client device through computer applications; setting up the interfaces of guides of client device for groups of people in group interactions of the same strategic level or between community of practice strategic levels; setting up specific interfaces of guides for individual actions on the client devices for individual interaction; manipulating guides on the client device group for the group interaction or when there is interaction between community of practice strategic levels; manipulating the individual guides on personal client devices when there are individual actions; storing the guide manipulation data in a distributed and asynchronous way on the client devices; maintaining versioning of data from historical records; synchronize data between client devices themselves and with the servers when the there is connectivity between them; and process the distributed guide data organizing and sorting out the history of best practices.

17 Claims, 13 Drawing Sheets

(51) Int. Cl.
  *G06Q 10/10* (2012.01)
  *G06F 3/041* (2006.01)
  *G06F 3/0488* (2013.01)
  *H04L 29/06* (2006.01)

(56) References Cited

U.S. PATENT DOCUMENTS

| | | | |
|---|---|---|---|
| 2003/0101066 A1* | 5/2003 | Jeanblanc | G06Q 10/10 706/45 |
| 2003/0216942 A1 | 11/2003 | Hawks | |
| 2005/0278642 A1 | 12/2005 | Chang et al. | |
| 2006/0112052 A1 | 5/2006 | Jeanblanc et al. | |
| 2006/0112054 A1* | 5/2006 | Jeanblanc | G06N 5/02 706/46 |
| 2007/0055564 A1* | 3/2007 | Fourman | G06Q 10/10 705/7.39 |
| 2008/0021719 A1* | 1/2008 | McFaul | G06Q 50/205 434/107 |
| 2011/0166904 A1 | 7/2011 | Arrowood | |
| 2011/0213840 A1 | 9/2011 | Boyer et al. | |
| 2014/0055422 A1* | 2/2014 | Guimaraes | G06F 3/042 345/175 |

OTHER PUBLICATIONS

International Search Report and Written Opinion for PCT/BR2013/000295 mailed Jan. 10, 2014.

* cited by examiner

METHOD AND SYSTEM IMPLEMENTED BY A COLLABORATIVE DISTRIBUTED COMPUTATIONAL NETWORK, AND RELATED DEVICES

RELATED APPLICATIONS

This application is the U.S. National Stage of International Application Number PCT/BR2013/000295, filed Aug. 8, 2013, which claims priority to and the benefit of Brazilian Patent Application Number 1020120200317, filed Aug. 10, 2012. The entire contents of the foregoing applications are hereby incorporated herein by reference.

TECHNICAL FIELD

The present invention relates generally to the field of technical systems, equipments and methods of digital computing and data processing, specially adapted for specific functions.

BACKGROUND ART

There is a plurality of systems and methods in the prior art oriented to cooperatively perform interactive operations.

Some conventional systems are oriented to collaborative environments. For example, the patent document EP0756237B1 (Canon Kabushiki Kaisha) describes ways to record environment configuration information to configure an application environment for cooperative operation for a group of workers. Patent document US20050278642A1 (Hewlett-Packard Company) describes a system for controlling a collaborative computing environment comprising: one or more servers, one or more client devices, a network that connects the server(s) with client device(s), a collaborative environment with a data structure that maintains the global state status of one or more environment elements of the collaborative environment, a module for collecting operating characteristics which describe at least one client device, a module for changing the way of rendering the environment elements for one or more client devices based on their operating characteristics, and a module to enable interactions between client devices and environment elements according to the current state of the environment elements in the global state data structure.

Other systems are oriented to communities of practice, for example, patent document U.S. Pat. No. 7,127,440 (Caterpillar Inc.) describes a method of implementing a community of practice to develop, for example, a program among employees, which involves identifying roles and responsibilities of participants and their goals, based on the need for the community of practice. The patent document US20060112052 (Caterpillar Inc.) describes a knowledge document management system for an organization, providing a knowledge document from a community of practice, to another practice in response to the request of respective member from other practice.

The definition of communities of practice is cited by patent document US20030216942 (ComsortInc) that describes a system for influence network marketing. This document describes that businesses, especially those in knowledge industries, have developed a big interest in promoting and forming communities of practice among organizations as a mean of providing a high quality mode of work for the company, in which communities of practice provide an effective way of managing organizational knowledge. The document US20030216942 cites this phenomenon as described by Wenger, McDermott, and Snyder in their book 'Cultivating Communities of Practice, chapter 1, pgs. 1-21'. As used in the document US20030216942, the term 'community of practice' can be taken to mean, as in the article by Lesser and Prusak, a group of individuals linked by informal relations that share similar work rules and a common context. The document US20030216942 also describes that Gongla and Rizzuto show their experiences with such communities of practice in a large organization, in their article titled 'Evolving Communities of Practice: IBM Global Services Experience.'

Still, regarding communities of practice, and their involvement with technology, the book 'Digital Habitats: Stewarding Technology for Communities' of Etienne Wenger, Nancy White, and John D. Smith defines that the three traditional elements of a Community of Practice establish demands regarding technology, as described below.

First, for the element 'domain', technology enables the communities and their members to explore, define and express a common identity; enables them to see which are the open issues and negotiate a learning agenda that is worth pursuing; establishes who are the members and their purposes, and can help communities discover where it stands. and reveal it to others.

For the element 'practice', technology allows for continuous mutual engagement around the practice; it provides access to each other's practices; it defines which learning activities are possible; it can accelerate the cycle in which members explore, test and refine good practices; it can help a community create a shared context over time for people to realize continuous exchanges, articulated perspectives, accumulated knowledge and provide access to histories, tools, solutions and concepts.

Finally, for the element 'community', technology can support the bonding experience that makes the community the social environment for group learning, it can help people meet and decrease isolation; reveals interesting connections and enables members to meet in relevant ways; it can increase the interaction between diversity and shared knowledge; and it enables various groups and individuals to have initiative, assume leadership roles develop new roles, and create subgroups, projects and conversations.

A technical problem in particular in view of the documents cited in the prior art is that they do not provide adequate control of the operations of cooperative interaction between different strategic levels of an organization, redefining (unfolding) the practice in cycles of planning and execution, while at the same time enabling the authorship by its users by using devices that comprise a highly cognitive compatible user interface.

SUMMARY OF THE INVENTION

The present invention provides a method and system implemented by a distributed collaborative computational network, and related devices. The method, system and devices target communities of practice, allowing for execution of cooperative interactive operations between different strategic levels of an organization, and authorship by users through the interface configured especially for this purpose.

The method and system are implemented by a collaborative computational network comprising a plurality of client devices supported by said computational network to cooperatively perform interactive operations in a community of practice organized in a hierarchical structure in at least two strategic levels, wherein, for example, said method comprising the steps of registering at least one community of practice in the computational network, creating a network of practice; associating a unique identification code for a network device in the computational network of the practice network; identifying a user via a unique identification code of user; connecting the user to at least one network of communities of practice; defining a practice; redefining the practice in strategic levels of the community of practice; registering the practice in the computational network, locating the practice in organizational or geographical coordinates; registering the localization of the practice in the computational network; selecting a guide template containing sequential instructions (as a script) made up of content and components; setting up a guide that implements the practice at strategic levels of the community of practice; publishing the guide in a client device through a computational application; implementing the guides interfaces for client device for groups of people in group interactions of the same strategic level or between strategic levels of the community of practice; implementing specific interfaces of the guides for individual actions in the client devices for individual interaction; manipulating the guides in the client device for groups in group interactions or when there is interaction between strategic levels of the community of practice; manipulating guides individually in personal client devices when there are individual actions; storing the data of the manipulated guides in a distributed and asynchronous way in the client devices, maintaining versioning of data through historical records; synchronizing guides data from client devices among themselves and with the servers whenever there is connectivity between them; processing data of guides distributed in the system, and provide the practices history sharing.

The present invention provides many advantageous effects by means of its system and method implemented by a collaborative distributed computational network forming a network of practice that is characterized by comprising a plurality of client devices supported by a computational network to cooperatively perform interactive operations in a community of practice organized in a hierarchical structure of at least two strategic levels.

Said method, system and related devices provide support for explicitly redefining practices in different strategic levels and dimensions, with guides and their sets of appropriate pages, taking into account the existing organization, formal relations between groups and the workplace culture.

It is also provided by the present invention the support to the complete cycles of practice planning and execution, taking into account the existing organization, with rules for the exchange of valid information between levels through computerized guides.

It is also allowed the authorship of guides that guide the practice by people with low computer literacy, leveraging the use of Information and Communication Technologies adapted to organizations by the employees themselves with their expertise in the environment in which they work.

Furthermore, the present invention provides support for the redefinition of planning tools aligned to the organization strategy and adapted to the specific strategic level and dimension. On the other hand, support is provided for the synthesis of information from each strategic level and dimension for use in other levels and dimensions by means of established procedures.

The present invention provides a support to the processes of unfolding and synthesis in a group computational device that supports collaborative face-to-face activities.

The support of a history of best practices is also enabled by the present invention, thus contributing to the process of drawing connections between the community of practice's processes of participation and reification in a systematic way.

Additionally, it is possible to support a practice performance evaluation through indicators (quantitative) and narratives of value creation (qualitative), in an integrated manner.

Finally, the present invention enables the support of curated use through a dedicated interface, the validated practice templates, the authorship of guides even by users with low computer literacy but who are specialists in the work domain, the guidance on filling the guides only with relevant information, and the cycles of practice use appropriated to the domain.

DESCRIPTION OF DRAWINGS

Hereinafter, the present invention will be described in conjunction with the figures and embodiments.

FIG. 5 is a detailed flowchart of the step of guides management in succession to

FIG. 4.

DETAILED DESCRIPTION OF THE EMBODIMENTS

Figure 1:
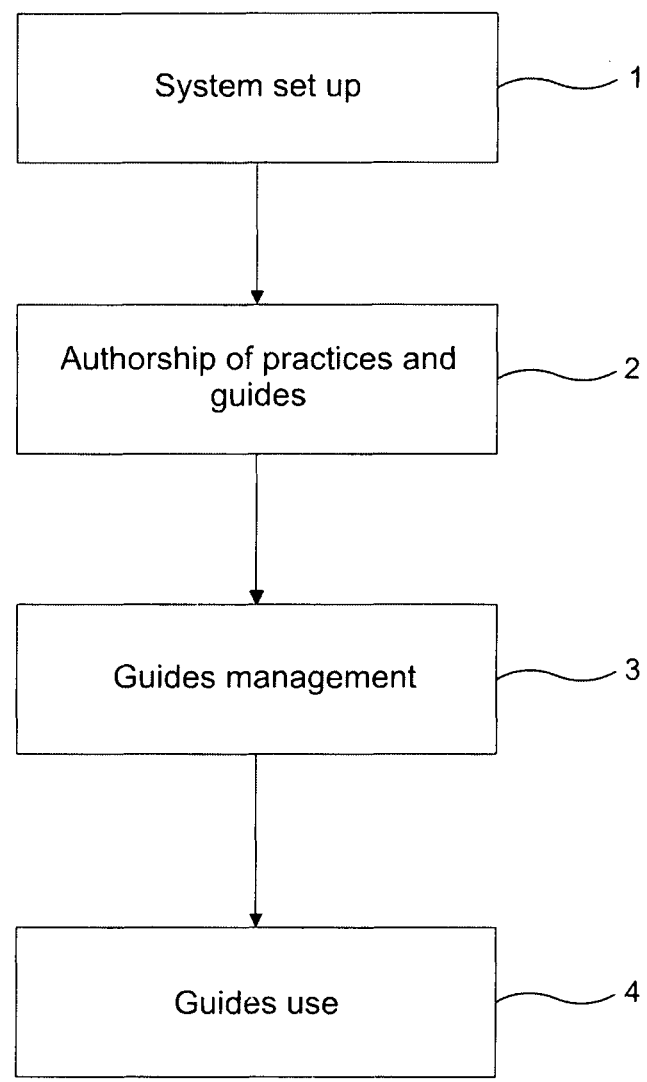
FIG. 1 is a general flowchart of an overall system of practices and guides in a collaborative computational network of the present invention.

FIG. 1 is a general flowchart showing the general steps of practices and guides for the method and system implemented by a collaborative distributed computational network of the present invention, comprising four general steps which refer generally to step (1) of system set up, general step (2) of authorship of practices, general step (3) of guide management, and general step (4) of guide use.

In the present invention, the terminology 'guide' should be understood as a result of composing electronic pages interface elements structured according to a template, for example, to be configured andor manipulated by users at certain superior strategic level and manipulated by users of an immediately inferior strategic level, which supports actions related to planning and performing a practice, and such actions may be carried out individually or in groups. For the term 'practice' it should be understood to refer to a purpose of a community of practice, which needs to unfold in at least two strategic levels and be reflected in all the guides of those strategic levels. Regarding the use of the term 'strategic level', it is understood that refers to each of the levels of strategic structure of an organization, also known as the strategic, tactical and operational level, and being arranged in this order.

Figure 2:
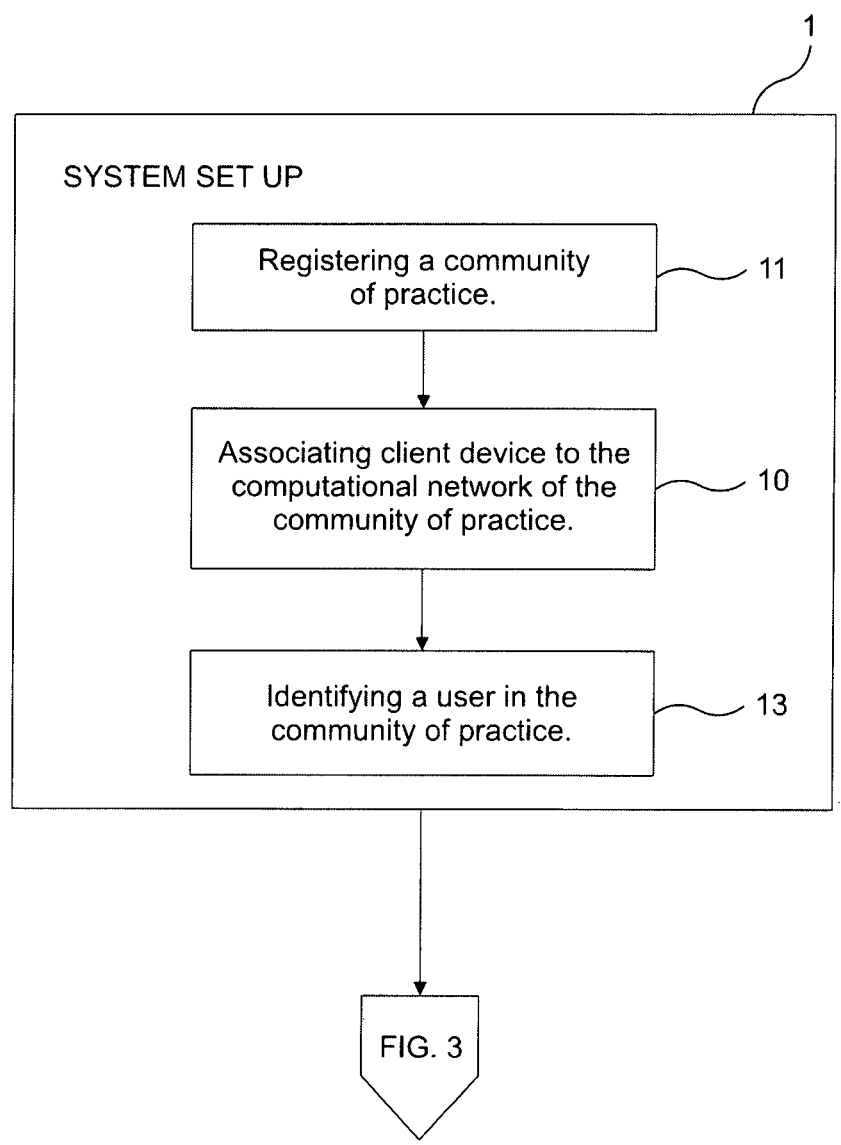
FIG. 2 is a detailed flowchart of the step of system implementation shown in FIG. 1.
Figure 6:
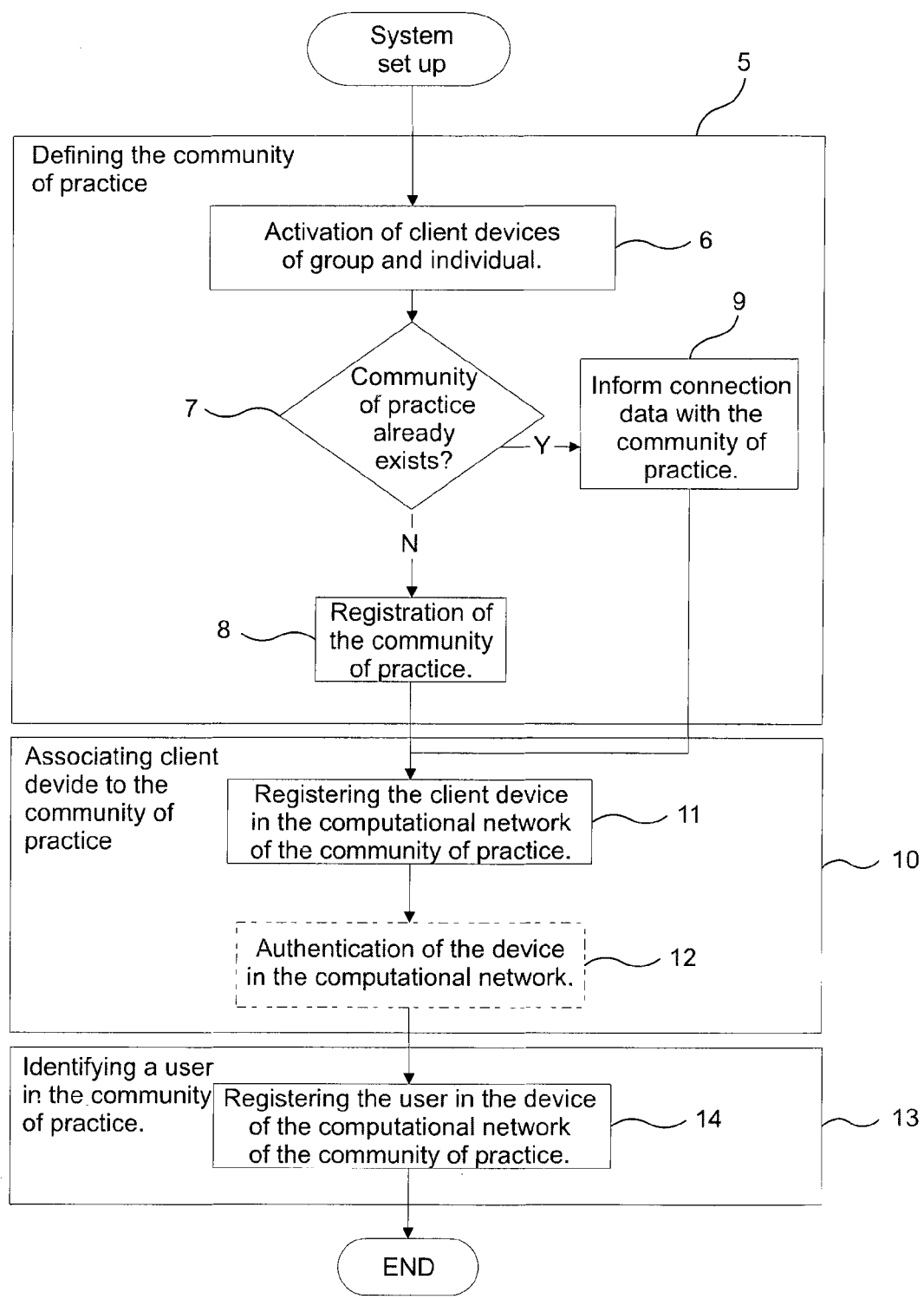
FIG. 6 is a block diagram of the implementation phase of the system of the present invention, detailing the definition of the community of practice, the assignment of the client device to the community of practice, and the identification of a user in the community practice.

As seen in the sequence of steps detailed in FIGS. 2 and 6, the initial general step (1) of the implementation of the system may be better understood. In order to perform the set up of the system it is first necessary step (5) of the definition of the community of practice, comprising a step (6) of activation of client devices for group and individual interaction, a step (7) of establishing whether a community of practice already exists, followed by step (8) of registration of the community of practice, or the step (9) of entering connection data for the community of practice, accordingly. Thus it is possible to go to step (10) of assigning the client device to the community of practice, comprising step (11) of at least one register of said community of practice in the computational network of community of practice, thus creating a network of practice by associating a unique identification code for a client device in the computational network of the network of practice, followed by, step (12) of authentication of said device to said computational network. After that, it is possible to go on to step (14) of user registration, through step (13) of identifying a user of the community of practice through a unique identification user code, then occurring the register of the user in the computational device of the community of practice and assigning it to at least one network of practice.

Figure 3:
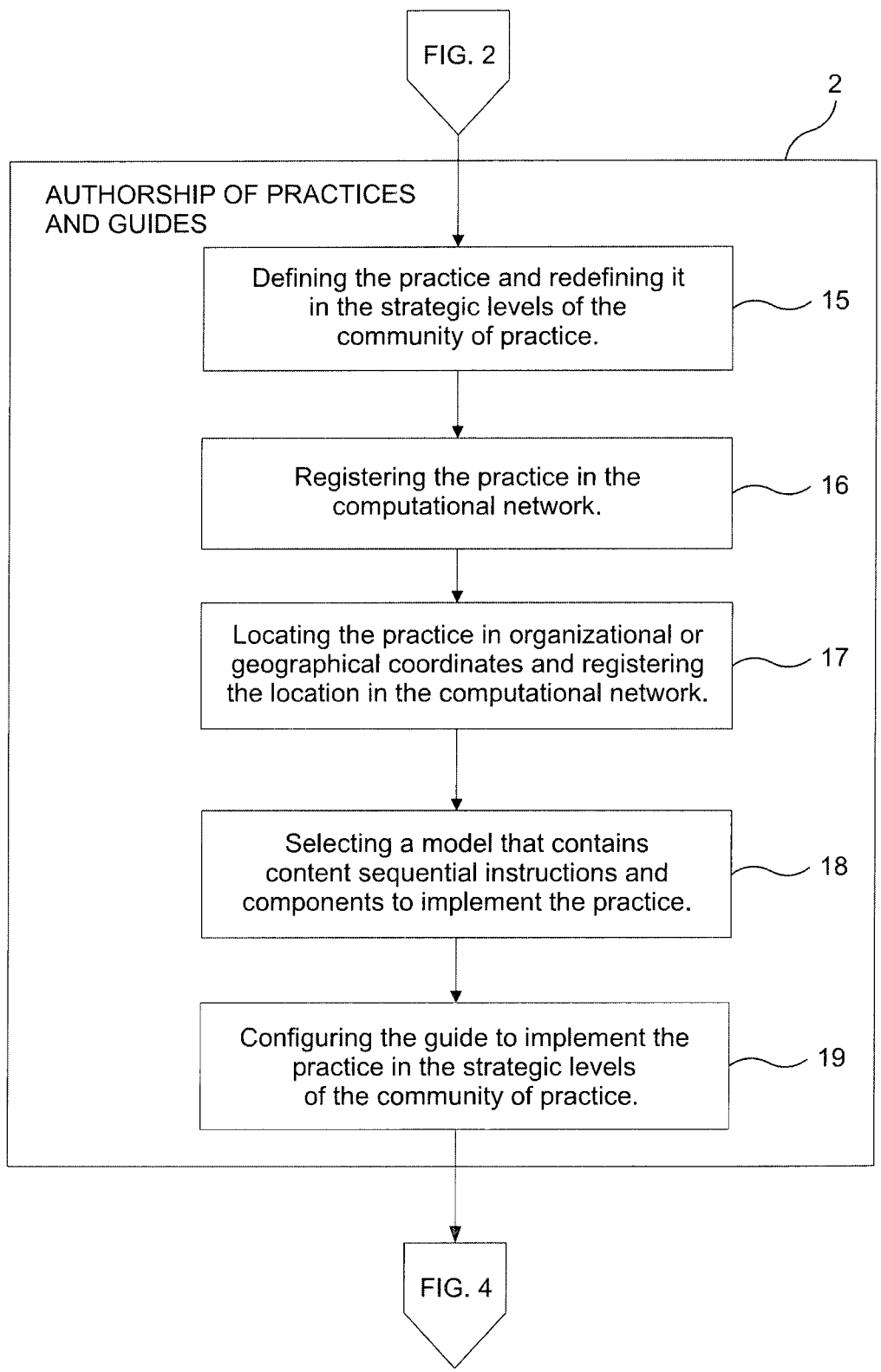
FIG. 3 is a detailed flowchart of the step of setting the authorship of practices and guides shown in FIG. 1.

After the system set up, follows general step (2) of authorship of practices and guides, and it is then necessary, as seen in FIG. 3, the initial step (15) of definition of a practice so as to unfold it in strategic levels of this community of practice, in the next step (16) the practice is registered on the computational network. Then follows step (1 7) in which the practice is located in geographic or organizational coordinates and the localization of the practice in the computational network is registered. It is then possible to go to step (18) in which a template guide containing sequential instructions (as a script) made up of content and components are selected so that the practice can be implemented. In this way, it is allowed the guide authorship in the client device. Finally, in the next step (19), it is possible to configure the guide so as to implement the practice at the strategic levels of the community of practice.

Figure 7:
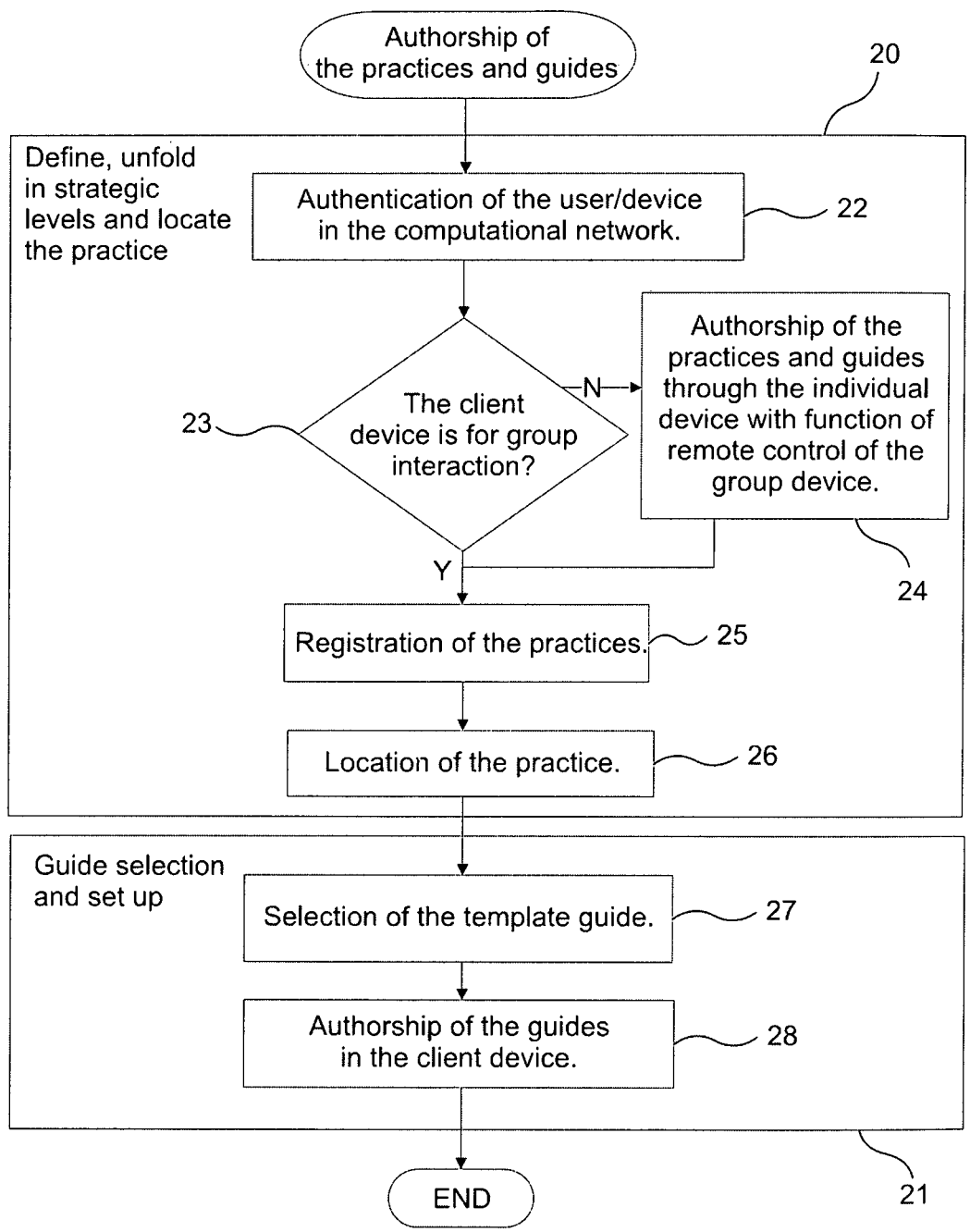
FIG. 7 is a block diagram of the step of practices and guides authorship of the present invention, detailing the definition of strategic levels and localization of the practices, and guide selection and set up.

Similarly, FIG. 7 shows a block diagram detailing step (20) of defining and redefining of strategic levels and localization of practice, and step (21) of selection and configuration of the guide. Authorship of practices and guides is initiated by the step (22) of user and device authentication in the computational network, when then there is the definition (23) if the client device is for group interaction or not, if not it can follow to step (24) of authorship of practices and guides through single use device that works as a remote control of group device, or if yes it follows to step (25) of registration of practices and then proceed to step (26) of localization of each practice. After localization of each the practice, it is enabled step (27) of guide template selection and then follows the step (28) of authorship of the guides in the client device.

Figure 4:
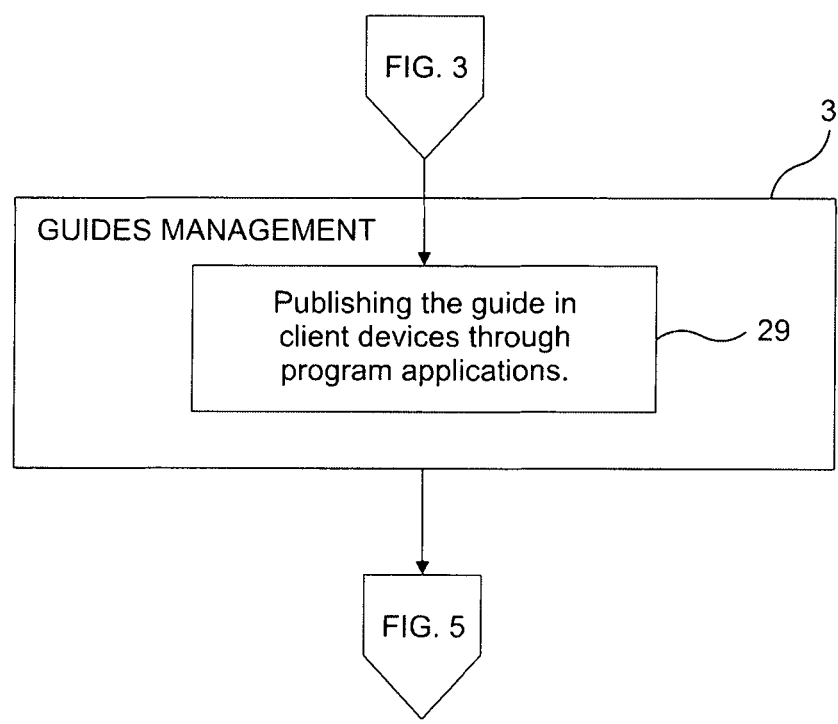
FIG. 4 is a detailed flowchart of the step of guides management shown in FIG. 1.
Figure 5:
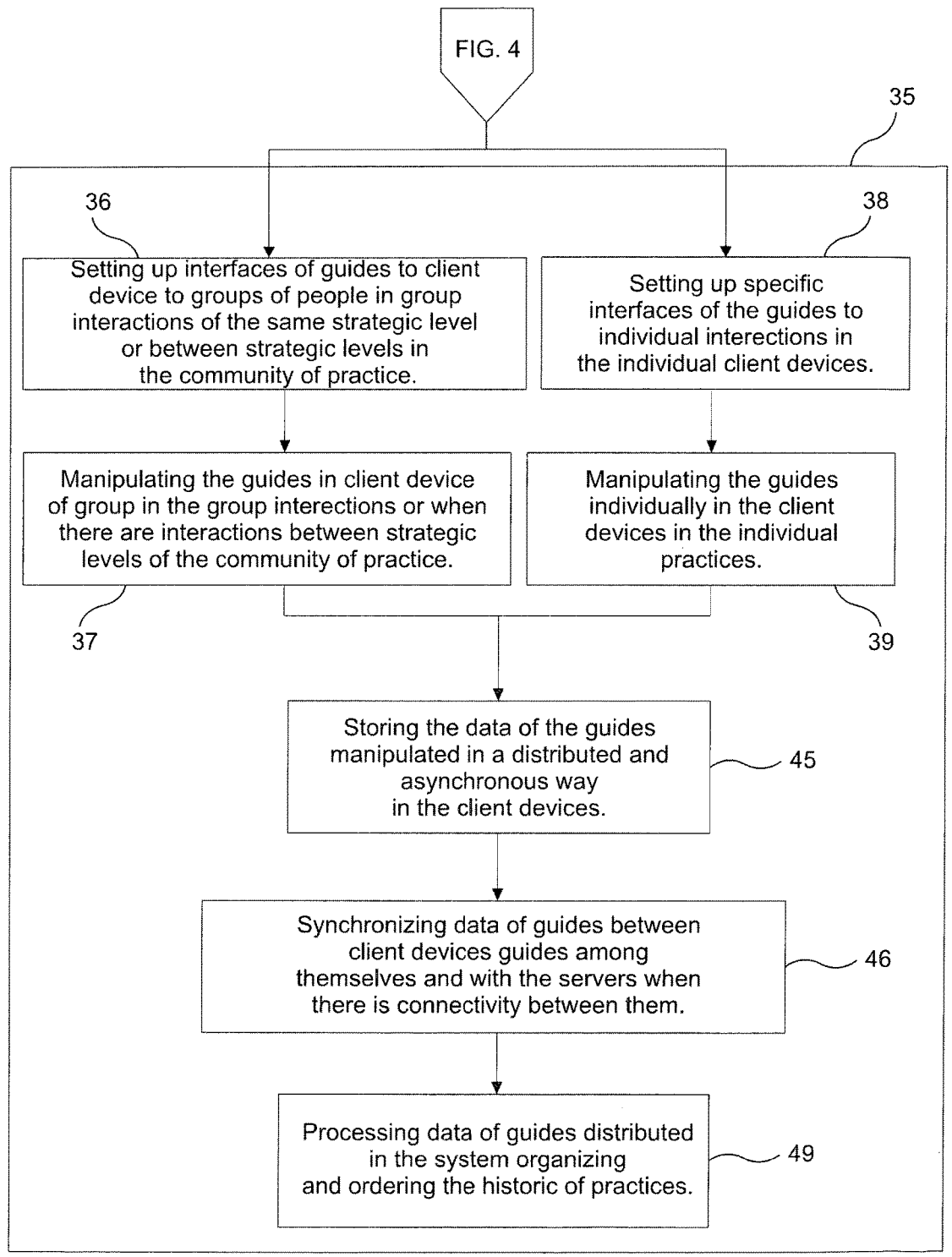
Figure 8:
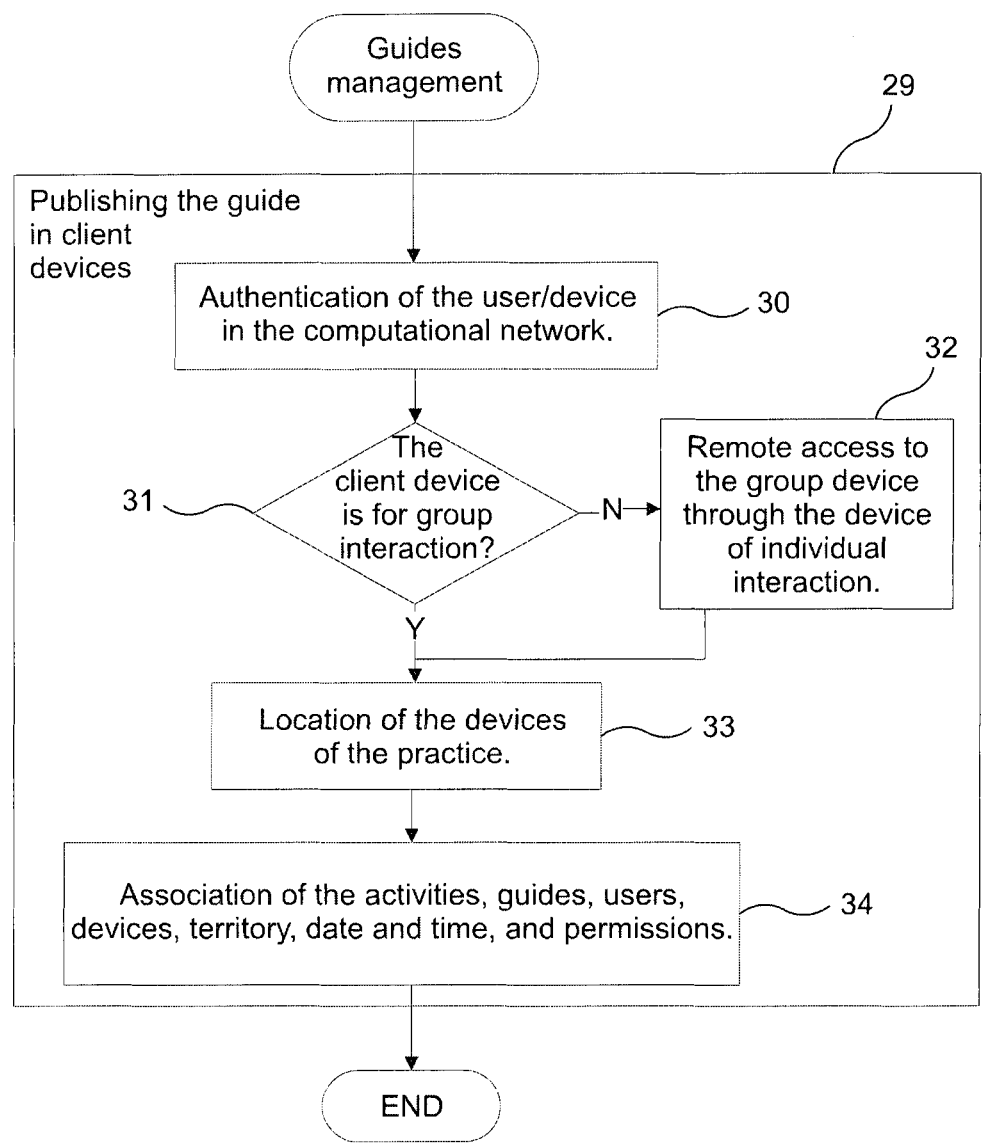
FIG. 8 is a block diagram of the step of guide management of the present invention, detailing the flow associated to publishing the guide in client devices.
Figure 9:
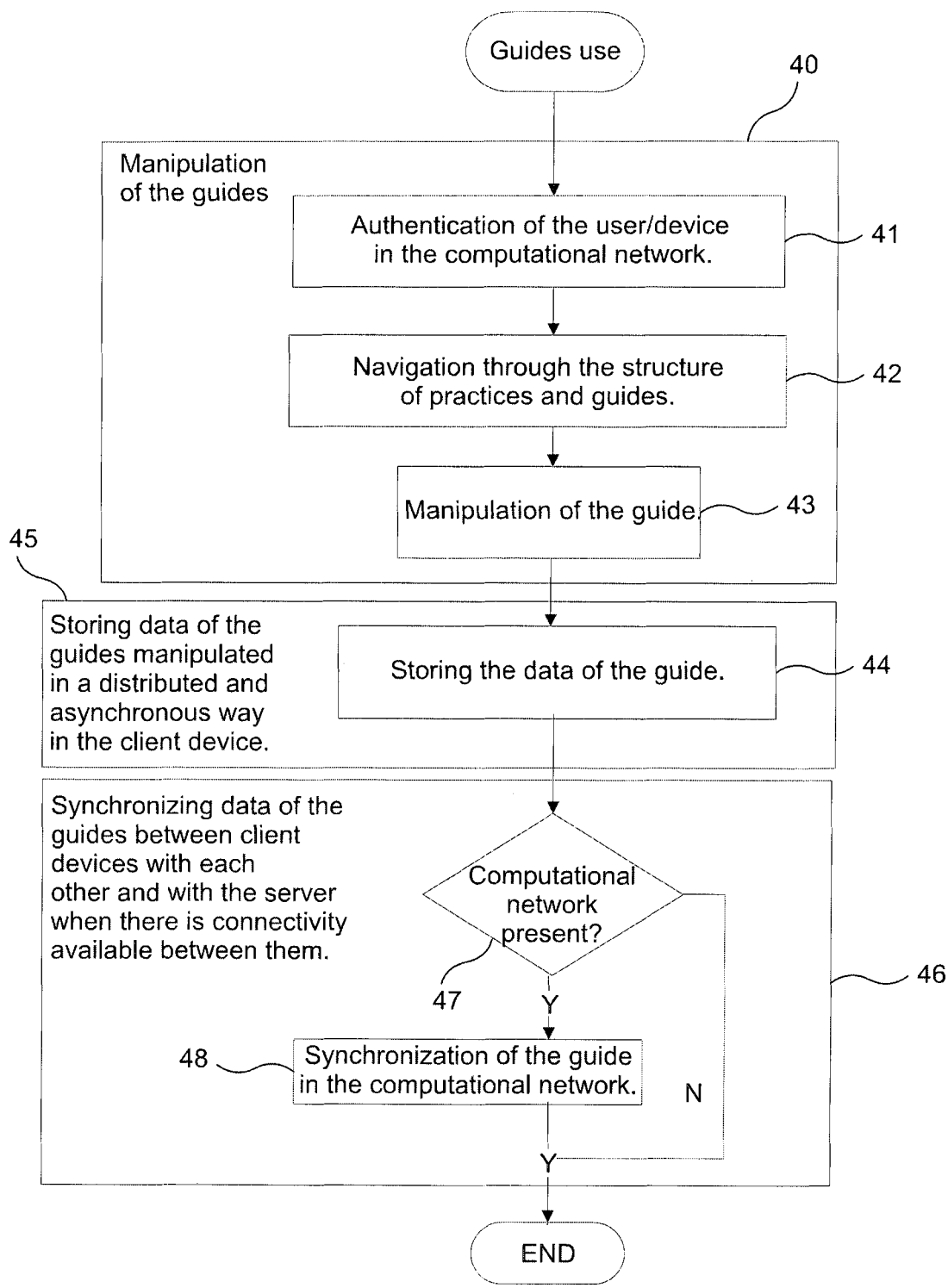
FIG. 9 is a block diagram of the step of guide use, detailing the manipulation, storage and synchronization of the guides.

General step (3) of guide management, as detailed in FIGS. 4 and 8, and general step (4) of guide use as detailed in FIGS. 5 and 9, comprise the initial step (29) of publishing the guide in a client device through program applications, consisting in step (30) of user or device authentication in the computational network, to define (31) if the device is of group interaction or not, and if not then it is possible to go to step (32) of remote access to the group device through a single use device, and if it is, follows to latter step (33) of allocation of devices of practice, and to the step (34) of association of information such as activities, guides, users, device, territory, date and time, and user permissions. After that, in the next step (35), guide implementation and manipulating paths are adopted for later storage, synchronization and data processing of the guides. On the one hand, there is step (36) of set up of guide interfaces for the client device for groups of people in group interactions of the same strategic level or between strategic levels in a community of practice, and then proceeds to step (37) of manipulation of the guides on the group client device when in group interaction andor when there is interaction between strategic levels of the community of practice. On the other hand, there is step (38) of set up of specific guide interfaces for individual actions in individual client devices and then proceed to step (39) of manipulation of the individual guides in individual interaction client devices whenever there are individual actions. In any event, specifically the step (40) of manipulation of the guides is the result of the actions included in step (41) of user andor device authentication in the computational network, by step (42) of navigation through the structure of practices and guides, and finally culminating in step (43) of manipulation of the guide. After guide set up and manipulation step (44) of storage of guide data is enabled, more specifically step (45) in which the data from manipulated guides is stored in a distributed and asynchronous manner in the client devices while maintaining data versioning through historic registers so that, only then, said data of the guides is forwarded to step (46) in which they are synchronized between client devices and among themselves, and with the servers when there is connectivity between them. In this step (46) of guide data synchronization there is a checkup (47) of whether there is a computational network present, and only if there is follows a step (48) of guide synchronization in the computational network. Finally, after step (46) of guide data synchronization follows step (49) in which guide distributed data is compiled by arranging and ordering practice history, for example, of best practices, and only then the sharing of such history of practices is made available.

Figure 10:
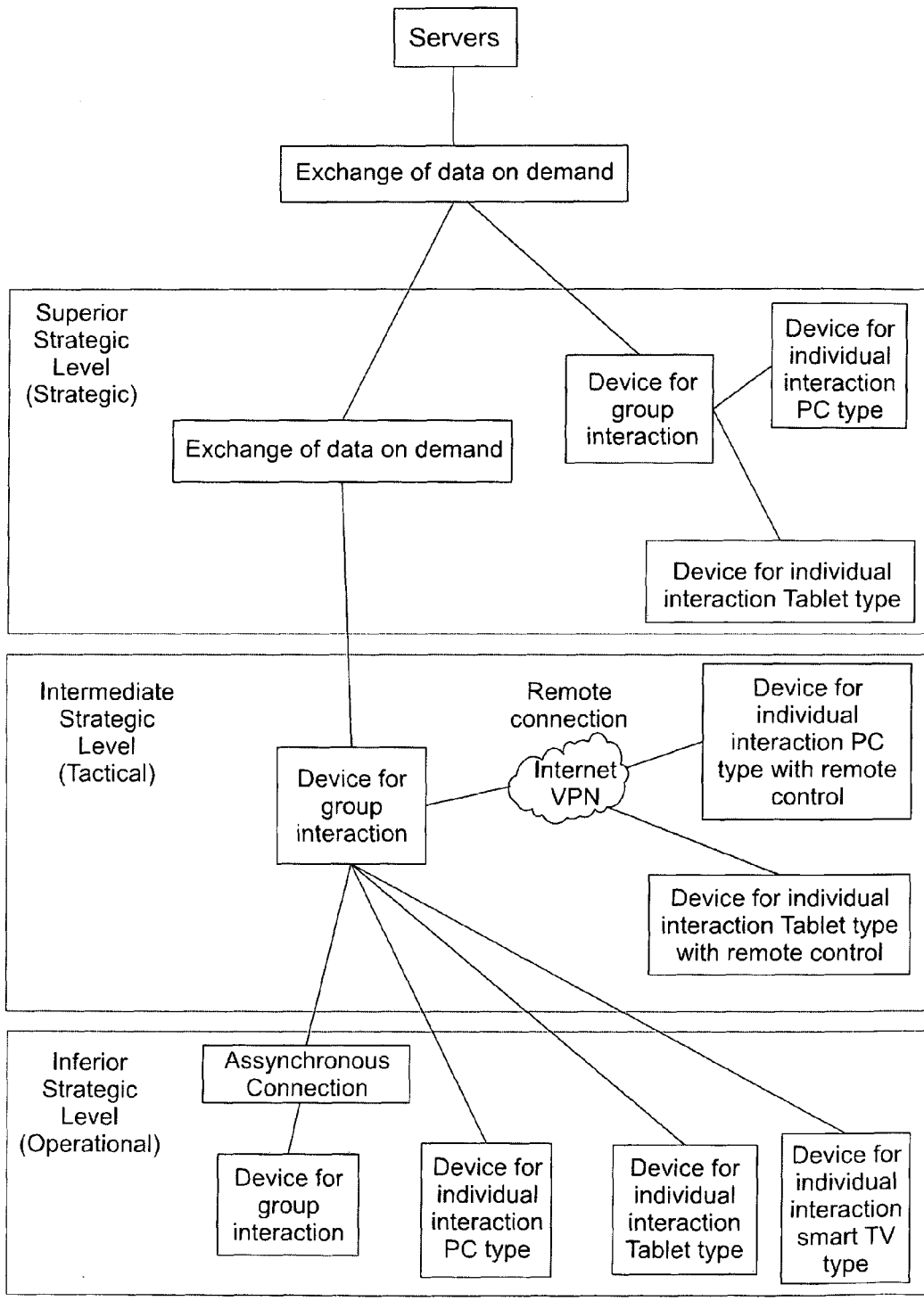
FIG. 10 is a representation of the network architecture, showing the relationship between various devices and servers in different strategic levels in accordance with the present invention.

A representation of the collaborative distributed computational architecture of a community of practice, in which are applied the method, system and device of the present invention can be seen in FIG. 10, which shows the relationship between servers and various client devices in different strategic levels.

The means of registration of a community of practice in the collaborative distributed computational network and creation of a network of practice include client devices distributed at different strategic levels of the hierarchical structure of the community of practice, and such client devices are categorized as client devices for individual interaction and client devices for group interaction.

Client devices for individual interaction can be any type of module, device structure or computational equipment wherein the user interaction with the device is done in a individual context with ability to interact, connect with other equipment to establish external communication, transmit and receive data. Devices such as personal computers, notebooks, laptops, PDAs or tablets are considered of interaction and individual viewing.

As for the client device for group interaction used in the present invention, they may be modules, device structures or electronic devices including hardware typically having one interactive surface such as multi-touch (touch screen technology), and one display-only or interactive panel for one or more users through specific user interface elements for setting up guides of practice, and such actions performed in these devices are supported by specific software. Such devices are particularly used in the areas of marketing, education, training, activity planning, decision-support, support for mission critical processes, supervision and control, therefore having particular application in the collaborative distributed computational network, particularly in the establishment of networks of communities of practice of the present invention, for supporting activities marked in the process as being group activities. Devices such as interactive projectors, smart TVs or whiteboards and others are also considered group interaction devices, but with individual intermediation by a member that operates the means of input of the device and whom may follow sequential instructions, define a path of interaction or even represent the group's.

The device for group interaction with individual intermediation is characterized by comprising: at least one display screen; a pointing device or other control device for individual intermediation with the interactive surface; a user interactive surface represented by the display screen coupled with the control device; means to lay out a plurality of user interface elements in the user interactive surface; means for detecting a user's action on the interactive surface for selection and activation of at least one of a plurality of user interface elements; and means to arrange a plurality of levels of navigation, and display at least one of said display screens in response to the selection and activation by a user of a user interface element in the user interactive surface.

In addition to the client devices, other means of registration of a community of practice in the collaborative distributed computational network and for creating a network of practice include servers connected to client devices at different strategic levels of the hierarchical structure of the community of practice, and databases distributed through different strategic levels of the hierarchical structure of the community of practice, and said databases are spread amongst distributed client devices and servers of said community of practice.

Said client devices, servers and distributed database also collaborate for the association and identification of a unique identification code for a device and a user in the collaborative distributed computational network of the network of practice, providing authentication of practice authorship among several hierarchical levels.

As means of connecting the user to the network of practice in the collaborative distributed computing network of the network of practice of the present invention can be used, beyond the proper client devices andor servers, other on demand connection and data exchange devices with or without wired connections between client devices and servers, or even devices for remote connection to the group client devices, such as a remote connection via Internet VPN.

The client devices, whether client devices for individual interaction or for group interaction, along with the servers connected to the client devices at different strategic levels of the hierarchical structure of the community of practice, and the databases distributed through different strategic levels of the hierarchical structure of the community of practice, which said databases are spread amongst client devices and servers of said community of practice, provide the definition, redefinition (unfolding), registration and localization of a practice among strategic levels of a community of practice on the collaborative distributed computational network.

The devices described in the international application PCT\BR2009\000423 and PCT\BR2011\000109, and Brazilian patent application (INPIBR) BRP11102625-1, documents that are incorporated herein by reference, are examples of suitable devices to implement the methods and systems described herein.

For an appropriate use of the practices implemented in different hierarchical levels, the guide interface has an essential role in the selection, configuration and implementation of practices between strategic levels on the collaborative distributed computational network of the present invention. To do so, a template guide interface is displayed on the client devices (for group or individual interaction), which comprises sequential instructions (as a script) made up of content and components. For interaction with a user are used computational applications for publication of the guide interface being displayed on said client devices. Such guide interface works as a tool for interaction between group client devices of the same strategic level or different strategic levels of community of practice, there may be a specific interface guide for individual actions in the client devices for individual interaction. The guide interface can be exemplified by a set of pages and references, such as screen sequences, similar to an electronic magazine, whose contents are selectable and editable by the user according to its current strategic level, and that is how the user sets up a practice.

As means of manipulating guides, an interface for user interaction is responsible for such manipulation in strategic levels of interaction of the community of practice, such interface being displayed in said group client devices and in such individual client devices. The interface for manipulation of guides is integrated to a hardware device, for example, multi-touch interfaces in group interaction devices, as described above.

As a particularly important feature of the present invention, the storage of data of guides manipulated in a distributed way in the collaborative computational network of the network of practice, is provided by the client devices and servers, which perform the distributed and asynchronous storage of data as well as historical recording of actions in different strategic levels of the hierarchical structure of the community of practice. The subsequent synchronization of guide data is performed between said client devices and servers that have connectivity with said client devices.

In order to manage the data of the manipulated guides, particularly adding data processing to the information generated by the network of practice, servers, as well as client devices, act as devices for organizing, sorting, and sharing the history of best practices.

As mentioned, the client device in the collaborative distributed computational network of the network of practice, particularly electronic devices featuring interactive multi-touch surface for individual or group interaction, present in different strategic levels of the hierarchical structure of the community of practice of the present invention have essential part in allowing authorship within communities of practice and the consequent generation of guides for practice.

To generate such guides for practice, the electronic device featuring multi-touch surface for individual or group interaction may comprise:

up to two display screens, wherein one of said display screens contains the user interactive multi-touch surface (such as an interactive desktop), means to provide a plurality of user interface elements on the user interactive multi-touch surface, means for detecting the user's touch on a display screen of user interactive multi-touch surface for selecting and activating of at least one of a plurality of elements of the user interface, and means for arranging a plurality of levels of navigation and displaying it on at least one of said display screens, in response to selection and activation by a user of the elements of user interface in the user interactive multi-touch surface.

Alternatively, for generating guides of practice, instead of the electronic device featuring interactive multi-touch surface for individual or group interaction, mobile devices such as tablets may be used. In this case, the only difference will be that this device is normally provided with only one screen for display and interactive surface performance. The means for arranging elements of user interface and touch detection may be similar, while the arrangement of levels of navigation and exhibition of guides of practice are necessarily similar among the many user interface devices of the present invention.

As to said user interface, it is characterized by comprising:

at least one of a plurality of editable elements of user interface arranged on the display screen of interactive multi-touch surface;

each user interface element contains editing attributes with information regarding navigation and editing modes in the configuration of a guide structure (FIG. 11A), wherein in a first display level, at least one element from a plurality of possible elements of user interface is made available for selection and activation by the user, wherein in response to manipulation by a user through the selection and activation of said first element of user interface, a new set of navigation elements is displayed, generating a second level of display, the previous level being kept on display;

subsequent levels of display set a composite guide structure;

each said display level is editable according to each user access permissions;

in response to manipulation by a user, each said display level is editable by changing the order of presentation, elimination and modification of said elements of user interface, and in response to manipulation by a user, each said display level is editable, by defining access permissions for other users.

Such user interface features can be better understood with FIGS. 11A to 11D that represent the various levels of sets of presentation elements featured on the client devices for individual or group interaction to generate guides of practice.

Figure 11A:
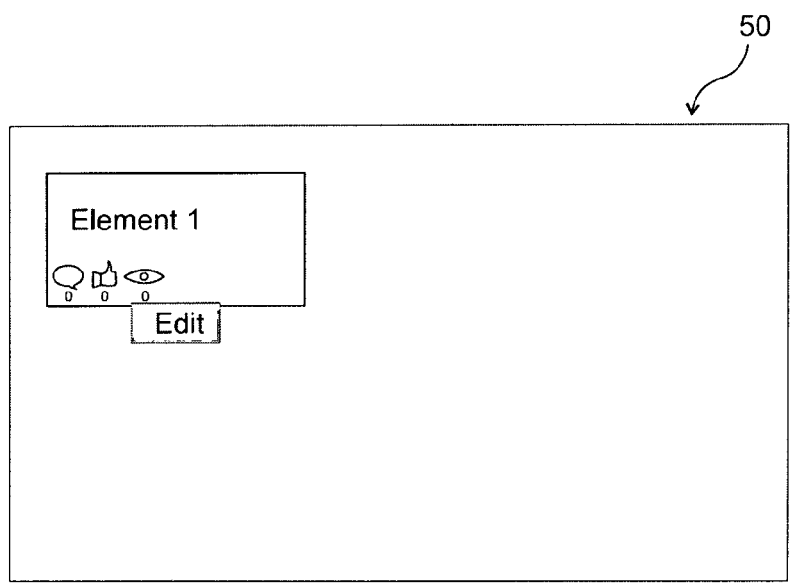
FIGS. 11a to 11d represent the various levels of navigation and presentation of the user interface elements displayed on the client devices for individual or group interaction to generate practice guides of the present invention.
Figure 11B:
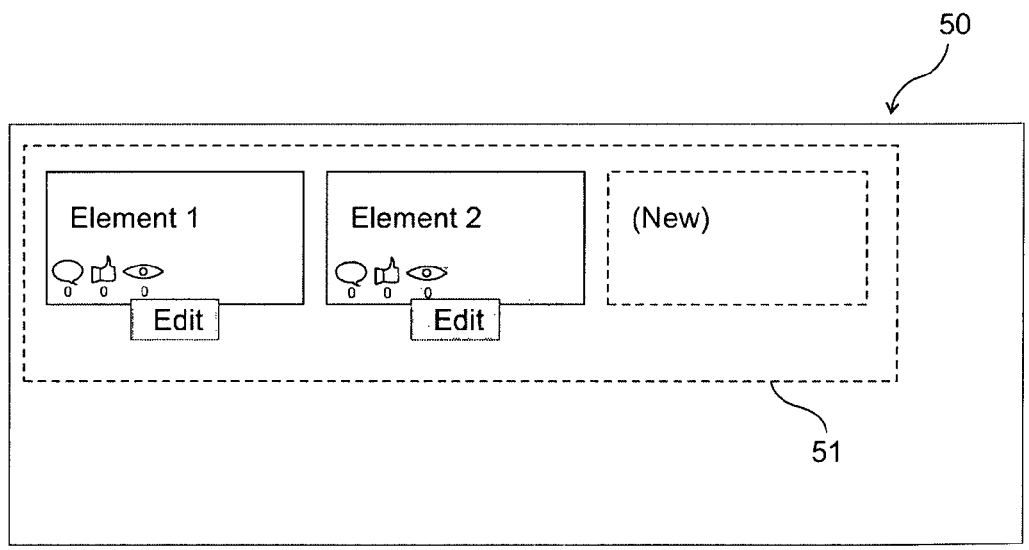

FIG. 11B illustrates a first level of navigation wherein a user interface element is presented in an interactive display surface (50), containing an information, whether simple or compound. The user interface element is represented by a rectangle (geometric shape adopted as an example as said interface element may take other shapes) that may or may not be activated or selected, and may contain attributes such as the number of views, the number of users who liked the item and the number of comments, and may contain controls that enable actions for the item, such as 'like' and 'comment'; and may contain links to related information, such as to who 'liked' it and to comments associated to each item (FIG. 11A).

The rectangle of a user interface element is both editable and actionable, the latter resulting in the opening of a new ordered set of rectangles in the interactive multi-touch display surface (50), as seen in FIG. 11B.

FIG. 11B illustrates a second level of navigation, which begins with an ordered set of user interface elements, such as rectangles arranged (for example, horizontally) in the interactive multi-touch display surface (50). Each user interface element represents a structured information element, setting up a guide page structure (51).

Figure 11C:
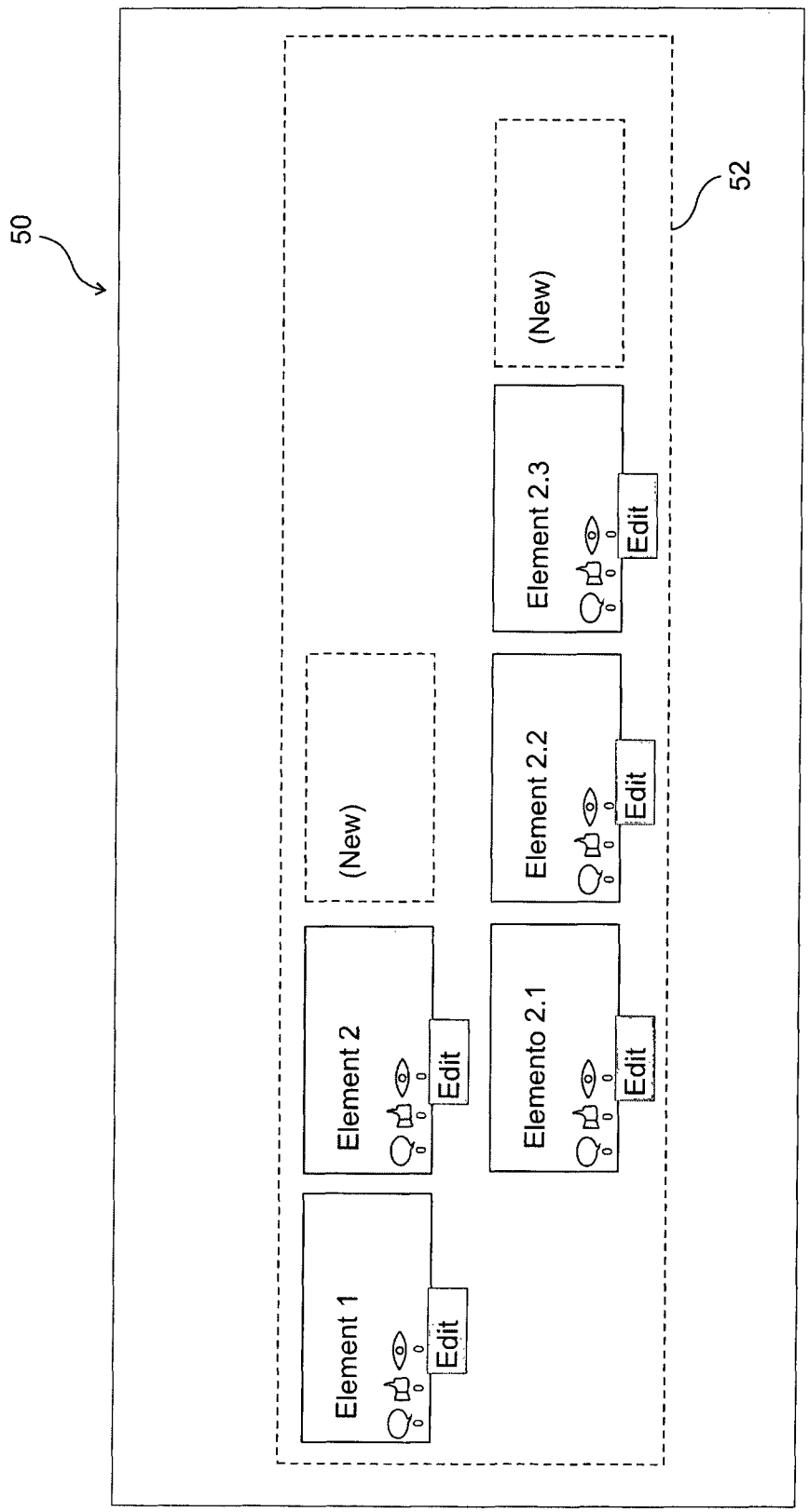

Since the user interface element rectangle is editable and can be activated by a user, it allows the subsequent opening of a new ordered set of rectangles on the interactive multi-touch display surface (50), and consequently a new guide page structure (52), as seen in FIG. 11C, keeping the former set still visible and its corresponding display element in a visual selected state (FIG. 11C)

Besides displaying the guide on the user interactive multi-touch surface, a detailed view for the selected item can also be displayed on a second screen or display context of said electronic device for individual or group interaction. In this case, it is on the second display screen further information from selected item: for composite elements, some summary of its components; for simple elements ('content') a visual representation for the element;

It is important to point out that at each level of navigation, each user interface element and each ordered set of said user interface elements can be edited at any time, as long as the user has the permission and the guide template allows it, and it is possible to change the display order, set type and content for the element, decide to eliminate or add user interface elements, or even define other users access permissions, The same behavior for structuring of the guide, with the same operations of usage apply to all navigation levels, including subsequent levels, as seen in FIG. 11C, wherein other subsequent guide page structure (52) is configured in the interactive multi-touch display surface (50).

Figure 11D:
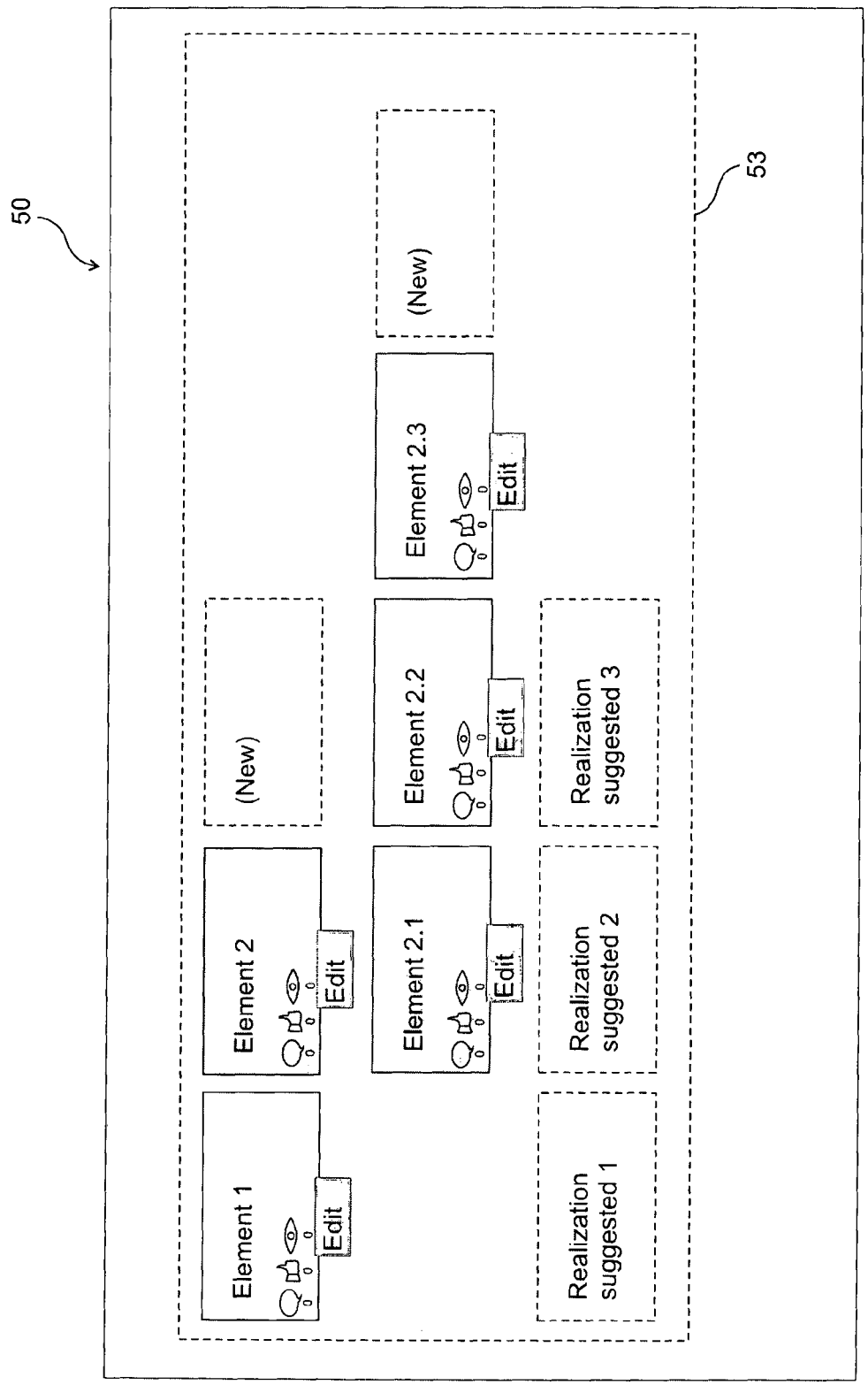

Whenever an element is being edited it suggests a composite (when it is a guide) or simple (when it is an atomic simple element) structure for its realization (FIG. 11D).

With the manipulation performed on the user interface, elements, navigating will by itself highlight the rectangles that have been activated and thus set the context for current information, allowing also for going back one's own steps to navigation that has been previously performed.

Note that each user interface element which contents are edited within the permitted realizations for this determined user interface element results in a new compound structure, such as a guide structure, or results in a simple structure such as an image, audio or video element.

Therefore, according to the present invention, guides can be viewed at any level of navigation, such as an electronic magazine, assembled from the contents of user interface elements contained within a particular level and subsequent levels.

The present invention enables the use of interface for communities of practice through its elements of user interface, enabling the manipulation and authorship of guides even by users with low computer literacy, just being required that the user learns how to manipulate a small set of interface elements to use them at all levels of navigation and execution.

Moreover, there is not the usual and artificial distinction between file folders, files and elements within a file. For slideshows, for example, sets of user interface elements would be used to organize them, being a compound element to represent the presentation, and compound elements to represent each slide, and simple elements to represent each information within a slide.

There is no distinction of viewing modes, for normal usage and authorship. Given the permissions, all users are consumers and authors of knowledge represented in the elements of information within the guides, which enables the protagonism of all members of a community of practice.

Therefore, a set of users can form the authorship of a sequence of elements of user interface which will be then used at a non-authorship level by a another set of users. Thus, users who typically are just consumers of preformatted Information and Communication Technologies acquire basic software authorship for themselves and other users, in a concept of the kind 'end-user programming'. This authorship enables, for example, a more prominent and active role for workers in work practices by defining ways of working for themselves and other users in according to the new knowledge of best practices. Thus, the present invention through its system, method and related devices, enables quick reflection lessons learnt and mean to disseminate best practices immediately and directly, with no need for technology brokers.

The invention claimed is:

1. A method implemented by a collaborative distributed computational network characterized by comprising a plurality of client devices supported by a computational network to cooperatively perform interactive operations in at least one community of practice organized in a hierarchical structure of strategic levels, the method comprising:
   a) registering the at least one community of practice on the computational network to create , a network of practice;
   b) assigning a unique identification code for a device on the computational network of the network of practice;
   c) identifying a user through a unique identification user code ;
   d) assigning the user to at least one network of practice;
   e) defining a practice;
   f) redefining the practice in strategic levels of a community of practice of the at least one community of practice;
   g) registering the practice in the computational network;
   h) locating the practice in organizational and/or geographical coordinates;
   i) registering the localization of the practice on the computational network;
   j) selecting a template for a guide, the template containing a script having sequential instructions and components;
   k) setting up the guide that implements the practice at the strategic levels of the community of practice;
   l) publishing the guide on a client device through computer applications;
   m) implementing interfaces for the guide for client devices for groups of people in group interactions on a same strategic level or between strategic levels in the community of practice;
   n) implementing the interfaces for the guide for individual actions on the client devices for individual interaction;
   o) manipulating the guide on a group client device in response to group interaction or interaction between strategic levels of the community of practice;
   p) manipulating the guide individually on personal client devices in response to individual actions;
   q) storing data of the manipulated guides in a distributed and asynchronous way on the client devices, maintaining versioning of the data through historical records;
   r) synchronizing data of the guide between client devices themselves and with the server whenever there is connectivity, and
   s) processing the distributed guide data, organizing and sorting out a history of best practices.

2. A system implemented by a collaborative distributed computational network comprising a plurality of client devices supported by a computational network to cooperatively perform interactive operations in at least one community of practice organized in a hierarchical structure in strategic levels, wherein said system comprises:
   a) a processor and memory;
   b) a registering module executed by the processor that registers at least one community of practice in the computational network to create, a network of practice;
   c) an assigning module that assigns a unique identification code to a device in the computational network of the network of practice;
   d) an identification module, which identifies the user through a unique identification user code, assigns the user to at least one network of practice;
   e) a module of practices definition, in which a practice is defined and unfolded in the strategic levels of the community of practice and registered on the computational network;
   f) a localization module that localizes the practice in organizational or geographic coordinates and registers the localization of the practice on the computational network;
   g) a selecting module to select, from the memory, a template for a guide, the template containing a script having sequential instructions content and components;
   h) a selecting and setting up module that configures the guide that implements the practice at the strategic levels of the community of practice;
   i) a publication module that publishes the guide on a client device through computer applications;
   j) a module for setting up interfaces that sets up specific interfaces of the guide for individual actions on client devices for individual interaction;
   k) a module for setting up interfaces that sets up specific interfaces of the guide for group actions on the client devices for group interaction;
   l) a module of implementation of guides, that manipulates the guide on a group client device for group interaction or when there is interaction between strategic levels of the community of practice;
   m) a module of implementation of guides, which manipulates the guide individually in personal client devices when individual actions are required;
   n) a module for storing data of the manipulated guide in a distributed and asynchronous way in the client devices, maintaining versioning of data by means of historic registering;
   o) a module of data synchronization of the guide between the client devices between themselves and the server when the presence of connectivity between them; and
   a module for processing and ordering of data of distributed guides in the system.

3. A devices structure for a collaborative distributed computational network comprising a plurality of client devices supported by a computational network to cooperatively perform interactive operations in at least one community of practice organized in a hierarchical structure at the strategic levels, said device structure comprising:

a) means for registering at least one community of practice on the collaborative distributed computational network and creation of a network of practice;

b) means for assignment and identification of a unique identification code to a device and a user on the network of practice collaborative distributed computational network;

c) means for connecting the user to the network of practice on the network of practice collaborative distributed computational network;

d) means for definition, unfolding, and registration of a practice in the strategic levels of a community of practice on the network of practice collaborative distributed computational network;

(e) means for localization of the practice in organizational and/or geographical coordinates;

(f) means for selection of a template for a guide, the template including a script having sequential instructions and components, setting up the guide that implements the practice at the strategic levels of the community practice on the network of practice collaborative computational distributed network;

(g) means for publishing the guide on a client device through computer applications, implementing interfaces for the guide for the client device for groups of people in group interactions of a same strategic level or between strategic levels in the community of practice, and implementing the specific interfaces for the guides for individual actions on the client devices for individual interaction;

(h) means for manipulating the guides on a group client device when there is group interaction or interaction between strategic levels of the community of practice, and manipulating the guide individually on personal client devices when there are individual actions;

i) means for storing guide manipulation data in a distributed way on the network of practice collaborative distributed computational network;

j) means for synchronizing data of the guide between client devices themselves and with the server whenever there is connectivity; and k) means for processing the distributed guide data, organizing and sorting out a history of best practices.

4. The devices structure for a collaborative distributed computational network according to claim 3, characterized by means for registration of at least one community of practice on a collaborative distributed computational network and creation of a network of practice comprising:

a) client devices distributed in different strategic levels of the of the community of practice hierarchical structure, whose client devices are:
a1) client devices for individual interaction;
a2) client devices for group interaction;

b) servers connected to client devices at different strategic levels of the community of practice hierarchical structure and c) databases distributed through different strategic levels of the community of practice hierarchical structure , and said databases are spread amongst client devices and servers of said community of practice.

5. The devices structure for a collaborative distributed computational network according to claim 3, characterized by the means of assignment and identification of a unique identification code to a device and a user on the network of practice collaborative distributed computational network comprising:

a) client devices distributed at different strategic levels of the community of practice hierarchical structure, whose client devices are:
a1) client devices for individual interaction;
a2) client devices for group interaction;

b) servers connected to client devices at different strategic levels of the community of practice hierarchical structure o, and c) databases distributed through different strategic levels of the community of practice hierarchical structure, and said databases are spread amongst client devices and servers of said community of practice.

6. The devices structure for a collaborative distributed computational network according to claim 3, characterized by means for connection of the user to the network of practice on the network of practice collaborative distributed computational network characterized by comprising:

a) client devices distributed at different strategic levels of the community of practice hierarchical structure, whose client devices are:
a1) client devices for individual interaction;
a2) client devices for group interaction;

b) servers connected to client devices at different strategic levels of the community of practice hierarchical structure, c) devices for connection and on demand wired or wireless exchange of data between client devices and servers, and d) devices for remote connection to the group client devices.

7. The devices structure for a collaborative distributed computational network according to claim 3, characterized by means of definition, unfolding, registration and localization of a practice in the strategic levels of a community of practice collaborative distributed computational network comprising:

a) client devices distributed at different strategic levels of the community of practice hierarchical structure whose client devices are:
a1) client devices for individual interaction;
a2) client devices for group interaction;

b) servers connected to client devices at different strategic levels of the community of practice hierarchical structure , and c) databases distributed through different strategic levels of the community of practice hierarchical structure, and said databases are spread amongst client devices and servers of said community of practice.

8. The devices structure for a collaborative distributed computational network according to claim 3, characterized by means of selection, setting up and implementation of practices in strategic levels on the network of practice collaborative distributed computational network comprising:

a) client devices distributed at different strategic levels of the community of practice hierarchical structure , whose client devices are:
a1) client devices for individual interaction;
a2) client devices for group interaction;

b) guide template interface displayed on said client devices containing sequential instructions content (as a script) and components;

c) publishing computer applications of the guide interface displayed on said client device;

d) guide interface for group interaction between workers from the same strategic level or different strategic levels of the community of practice;

e) specific guide interface for individual actions on the individual client devices;

f) manipulation interface of guides between interaction strategic levels of the community of practice featured on said group client devices; and g) means for processing the data of the manipulated guides in a distributed way on the network of practice collaborative distributed computational network.

9. The devices structure for a collaborative distributed computational network according to claim 3, characterized by means of storing the data of the manipulated guides in a distributed way on the network of practice collaborative distributed computational network comprising:

a) client devices for distributed and asynchronous data storage and historic register of actions at different strategic levels of the community of practice hierarchical structure, whose client devices are:
a1) client devices for individual interaction;
a2) client devices for group interaction;

b) servers for distributed and asynchronous data storage and historical record of actions at different strategic levels of the community of practice hierarchical structure; and c) devices for guide data synchronization through client devices, and servers that have connectivity with said client devices.

10. The devices structure for a collaborative distributed computational network according to claim 3, characterized by means of data processing of the manipulated guides in a distributed way on the network of practice collaborative distributed computational comprising servers or client devices for organization, sorting out and sharing the history of practices.

11. The client devices distributed on the network of practice collaborative distributed computational network presented in different strategic levels of the hierarchical structure of the community of practice according to claim 3 characterized by being constituted by one or more of:

a) electronic device with individual or group multi-touch interactive surface;
b) individual interaction device of the personal computer kind;
c) individual interaction mobile device, and
d) device for group interaction with individual intermediation of the smart television kind.

12. The client device according to claim 11, whose electronic device with individual or group multi-touch interactive surface is characterized by comprising:

at least two display screens;
one of said display screens comprising multi-touch interactive surface for a group of users or an individual;
means for arranging a plurality of elements of user interface on the multi-touch interactive surface;
means for detecting users' touch on a display screen of user multi-touch interactive surface for selection and activation of at least one of a plurality of user interface elements, and means for arranging a plurality of levels of navigation, and displaying on at least one of said display screens in response to user interface element selection and activation by a user on the user multi-touch interactive surface.

13. The client device according to claim 11, whose individual interaction mobile device is characterized by comprising at least one display screen;

said display screen comprising the user multi-touch interactive surface; means for arranging a plurality of elements of user interface on the user interactive multi-touch surface;

means for detecting users' touch on a display screen of user multi-touch interactive surface for selection and activation of at least one of a plurality of user interface elements, and means for providing a plurality of levels of navigation and displaying at least one of said display screens in response to user interface element selection and activation by a user on the multi-touch interactive surface.

14. The client device according to claim 11, in which the group interaction device with individual intermediation is characterized by comprising:

at least one display screen;
a pointing device or other control device for individual interaction with the interactive surface;
a interactive user surface configured by the display screen coupled with the control device;
means for arranging a plurality of elements of user interface on the user interactive surface;
means for detecting user's action on the interactive surface for selection and activation of at least one of a plurality of elements of user interface, and
means for arranging a plurality of levels of navigation and displaying at least one of said display screens in response to user interface elements selection and activation by a user on the user interactive surface.

15. The user interface in the client device according to claim 12, whose said user interface is characterized by comprising:

at least one of a plurality of user interface editable elements arranged on the display screen of a multi-touch interactive surface;
each element of user interface containing contains editing attributes with information regarding navigation and editing modes in the configuration of a guide structure, wherein in a first display level, at least one element from a plurality of possible elements of user interface is available for selection and activation by the user;
in response to manipulation by a user through the selection and activation of said first element of the user interface, a new set of navigation elements is displayed, generating a second level of display, maintaining the previous level display;
subsequent levels of display setting up said compound guide structure;
each said display level is editable according to each user access permissions;
in response to manipulation by a user, each said display level is editable by changing the order of presentation, elimination and modification of said user interface elements; and
in response to manipulation by a user, each said display level is editable by defining access permissions for other users.

16. The user interface in the client device according to claim 13, whose said user interface is characterized by comprising:

at least one of a plurality of user interface editable elements arranged on the display screen of a multi-touch interactive surface; each element of user interface containing contains editing attributes with information regarding navigation and editing modes in the configuration of a guide structure, wherein in a first display level, at least one element from a plurality of possible elements of user interface is available for selection and activation by the user; in response to manipulation by a user through the selection and activation of said first element of the user interface, a new set of navigation elements is displayed, generating a second level of display, maintaining the previous level display; subsequent levels of display setting up said compound guide structure; each said display level is editable according to each user access permissions; in response to manipulation by a user, each said display level is editable by changing the order of presentation, elimination and modification of said user interface elements; and in response to manipulation by a user, each said display level is editable by defining access permissions for other users.

17. The user interface in the client device according to claim 14, whose said user interface is characterized by comprising:

at least one of a plurality of user interface editable elements arranged on the display screen of a multi-touch interactive surface; each element of user interface containing contains editing attributes with information regarding navigation and editing modes in the configuration of a guide structure, wherein in a first display level , at least one element from a plurality of possible elements of user interface is available for selection and activation by the user; in response to manipulation by a user through the selection and activation of said first element of the user interface, a new set of navigation elements is displayed, generating a second level of display, maintaining the previous level display; subsequent levels of display setting up said compound guide structure; each said display level is editable according to each user access permissions; in response to manipulation by a user, each said display level is editable by changing the order of presentation, elimination and modification of said user interface elements; and in response to manipulation by a user, each said display level is editable by defining access permissions for other users.

* * * * *